Jan. 7, 1958 A. L. BAKER 2,818,652
TRANSIT
Filed June 23, 1953 2 Sheets-Sheet 1
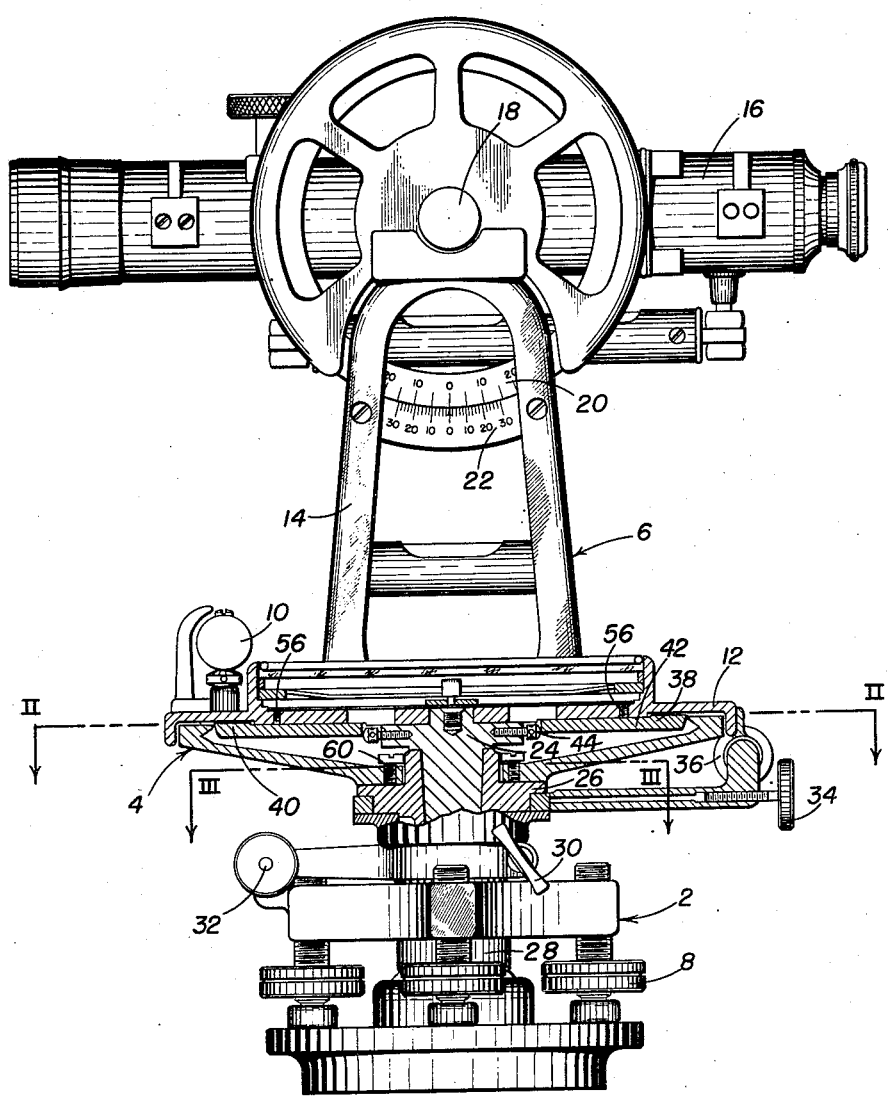
Fig. I.
INVENTOR.
ALLISTER L. BAKER
BY
ATTORNEY Jan. 7, 1958     A. L. BAKER     2,818,652
TRANSIT
Filed June 23, 1953     2 Sheets-Sheet 2
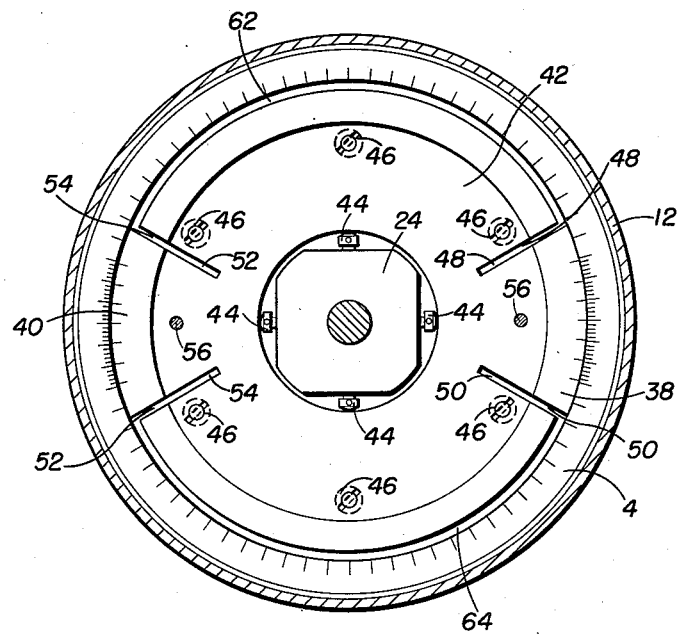
Fig. II
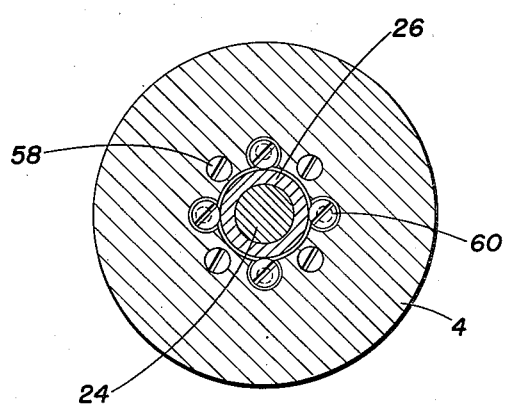
Fig. III
*INVENTOR.*
ALLISTER L. BAKER
BY
ATTORNEY United States Patent Office 2,818,652
Patented Jan. 7, 1958

2,818,652
TRANSIT

Allister L. Baker, Denville, N. J., assignor to Keuffel & Esser Company, Hoboken, N. J., a corporation of New Jersey Application June 23, 1953, Serial No. 363,590

3 Claims. (Cl. 33—72)

This invention relates to surveying instruments. More particularly it relates to an improved construction and method for mounting the verniers of surveying instruments in proper adjusted position with respect to the divided circle.

Surveying instruments (more specifically transits) are normally provided with a pair of diametrically opposite verniers carried by a portion of the instrument (usually the alidade) that rotates with respect to the divided circle. In order for the instrument to be in perfect adjustment, the graduation on both the verniers and the divided circle should all radiate from a common center which lies on the axis of rotation and which is concentric with the circular reading edge of the divided circle and the arcuate reading edges of the verniers. In addition the spacing between the arcuate reading edges of the verniers and the circular reading edge of the divided circle must be accurately spaced at a clearance which assures freedom of rotation of the parts but allows a minimum amount of parallax error to enter into the readings. In most cases the permissible clearance is of the order of .001 inch. The graduated surfaces of the divided circle and vernier must also lie in the same plane and the length of the vernier (the angle subtended by the extreme graduations) must accurately match the distance between corresponding graduations of the divided circles. Corresponding diametrically opposite vernier graduations have to line up with diametrically opposite graduations on the divided circle.

Conventionally, the verniers of surveying instruments have been produced in the form of two separate arcuate metallic pieces each of which is held onto the rotatable part of the instrument by two screws. Oversize holes have been provided in the verniers for these screws in order to permit adjustment. With this construction it is necessary to use an extremely tedious time consuming process of trial and error by operators of the highest skill in order to make all of the adjustments referred to above.

The principal objects of the present invention are to provide an improved and simplified construction and method for adjusting the verniers of a surveying instrument.

These and other objects of the invention will be more fully understood by reference to the following description taken in connection with the accompanying drawing in which:

Fig. I is a view in side elevation partly in section of a surveying instrument.

Fig. II is a view in sectional plan taken along the line II—II of Fig. I and looking in the direction of the arrows.

Fig. III is a view in sectional plan taken along the line III—III of Fig. I and looking in the direction of arrows.

Referring to Fig. I, the surveying instrument is made up generally of a base or levelling head 2, a divided circle or graduated limb plate 4 and an alidade 6. As is well known in the art, a large diameter internal thread may be provided at the bottom of the leveling head by means of which the instrument is mounted on a tripod. Three or four leveling screws 8 are provided for leveling the instrument on the tripod. Level vials such as the plate level 10 are provided to indicate when the instrument is level (vertical axis of rotation in the direction of gravity).

The alidade 6 is made up of a horizontal plate 12 extending over the divided circle 4, a pair of standards such as standard 14 (the other standard is hidden behind standard 14 in Fig. I), a telescope 16 mounted for rotation about a horizontal axle 18 between the standards and a vertical circle 20 mounted for rotation with the horizontal axle 18 and telescope 16. The vertical circle 20 is normally read by means of one vernier 22 secured to the standard 14.

The alidade 6 is carried on male center 24 mounted within female center 26 which carries the divided circle 4. Female center 26 may also be mounted for rotation within an outer center 28 carried by the leveling head 2. Although the invention is described in conjunction with the adjacent type of center construction shown, it will be understood by those skilled in the art that it is also useful with other types of center construction such as the independent center construction.

In the center construction shown, a clamp operated by the clamp screw 30 acts between the leveling head 2 and the female center 26 to prevent the divided circle 4 from turning. The tangent screw 32 is provided for fine adjustment of the circle 4. The clamp operated by the screw 34 acts between the alidade 6 and the female center 26 to clamp the alidade 6 and divided circle 4 together. The tangent screw 36 provides a fine adjustment between the alidade and circle.

In the construction according to the present invention, both verniers 38 and 40 for the divided circle 4 are provided on the vernier carrying plate 42. The verniers 38 and 40 are made an integral part of the vernier carrying plate 42. For example, this may be accomplished by using one continuous piece of metal (e. g. aluminum) for the verniers 38 and 40 and the plate 42 or by brazing, soldering or otherwise inlaying the metal (e. g. silver) of the verniers 38 and 40 to the plate 42. As is well known in the art, the graduations of the divided circle may be cut directly into the metal of the limb plate 4 (in this case the limb plate 4 is usually made of aluminum) or they may be cut in the surface of a metal such as silver inlaid on the upper surface of the limb plate 4.

Four screws 44, acting parallel to the plane of the graduations are provided in the male center 24. Each pair of these screws extends along a diameter and the two diameters are mutually perpendicular. The heads of the screws 44, act against the inside diameter of the vernier carrying plate 42 and act upon the plate 42 in opposing relation to each other along each diameter. One pair of screws is aligned with the zero marks on both verniers for adjusting the space between the outer arcuate edges of the verniers 38 and 40 and the inner circular reading edge of the divided circle 4. The other perpendicular pair of screws is for adjusting corresponding graduations on both verniers so that they will line up with diametrically opposite graduations on the divided circle 4.

A number of locking screws 46 (see Fig. II) are provided to lock the vernier carrying plate 42 to the horizontal plate 12 of the alidade 6 in adjusted position. The vernier carrying plate 42 may be slotted as shown at 48, 50, 52 and 54 to separate the verniers 38 and 40 from the body of the vernier carrying plate 42. Screws 56 acting between the horizontal plate 12 and the separated portions of the vernier carrying plate 42 bend the verniers downward to adjust the height of the verniers and bring their graduated surfaces into the plane of the graduated surface of the divided circle 4. The parts are made so that only a few thousandths of an inch adjustment is necessary in this direction, to avoid any appreciable tilting of the verniers. As shown in Fig. II, the outer edge of the vernier carrying plate 42 is undercut except in the region of the verniers 38 and 40.

Means are preferably also provided for adjusting the divided circle 4 to make the graduations provided thereon concentric with the axis of rotation. For example, this adjustment means may be as shown in Fig. III. Clearance is provided between the inner-diameter of the limb plate 4 and the corresponding surface on the female center 26. The eccentric heads of the four screws 60 contact this surface and afford a means for adjusting the divided circle 4 to make it concentric with the axis of rotation. The screws 58 are then used to lock the divided circle in adjusted position on the female center 26.

It will be understood that while the adjusting means for centering the vernier carrying plate 42 and the divided circle 4 have been described quite specifically in detail, other equivalent means may also be used. For example, the type of means used for centering the divided circle 4 might be used for centering the vernier carrying plate 42 and vice versa.

In the production of the surveying instruments described above, it is important that the circle 4 be provided with a flat upper surface for the graduations and an arcuate circular inner reading edge. The circle 4 is then mounted on a dividing machine so that the flat upper surface is perpendicular to the axis of rotation and so that the center of the circular reading edge lies on the axis of rotation. Means for making these adjustments are well known in the art. If these adjustments are carefully made and if the dividing tool is adjusted to cut along a line passing through the axis of rotation, when the circle is removed from the machine, the graduations will radiate from the center of the inner circular reading edge of the circle 4.

The circle must then be mounted on the center 26 so that the center of graduations lies on the axis of rotation of the center. This can be done by using an accurate dial gage temporarily carried by the male center and contacting the inner circular edge of the divided circle 4. However, it is more accurate to use an optical device sighted on the graduations for this purpose. This could consist merely of two microscopes carried vertically over diametrically opposite parts of the circle 4 by a bracket temporarily carried on the male center 24 and focused on the graduations. These microscopes should be equipped with filar micrometers. The index lines of the microscopes are set on the 0 and 180° lines of the divided circle for example. The microscopes are then reversed by turning them on the male center 24 so that the microscope formerly over the 0 line is over the 180° line and vice versa. By turning around the center 24, the index line of one microscope is lined up accurately with the 0 or 180° line of the circle and the circle is adjusted by means of one pair of the screws 60 to move the diametrically opposite line half of the distance to the micrometer index line. This procedure can be repeated as many times as is necessary to center the circle along the 0°–180° diameter to the required accuracy. The procedure is then repeated for the 90°–270° diameter to completely center the circle. A final check should be made on the 0°–180° diameter. The vernier carrying plate 42 is mounted on a dividing machine and adjusted so that the upper surfaces at 38 and 40 are perpendicular to the axis of rotation of the dividing machine and so that the arcuate outer edges of the vernier are centered on the axis of rotation. To assist in this last adjustment the recessed arcuate edges 62 and 64 of the vernier carrying plate are preferably turned concentric with the arcuate edges of the verniers 38 and 40. The arcuate edges of the verniers 38 and 40 are accurately turned to a predetermined radius which is a predetermined amount shorter than the radius of the inner circular reading edge of the divided circle 4 so that, when the verniers are adjusted on the instrument, there will be predetermined space between the arcuate edge of the verniers 38 and 40 and the circular reading edge of the divided circle 4.

When the vernier carrying plate 42 is properly adjusted on the dividing machine as described and when the dividing tool is adjusted to cut along a line passing through the axis of rotation of the dividing machine, the graduations will radiate from the common center of the arcuate edges of the verniers 38 and 40. The vernier carrying plate 42 is then removed from the dividing machine and mounted underneath the horizontal plate 12 by loosely inserting the screws 46. The pair of screws 44 in line with the zero lines of the verniers 38 and 40 are then adjusted to make the space between both verniers and the edge of the circle equal. The pair of screws 44 along the perpendicular diameter are then adjusted so that the zero lines of the two verniers will line up respectively with the 0 and 180° lines of the divided circle for example. It will be course be necessary to remove the alidade plate 12 and male center 24 from the female center 26 when making these adjustments, reinserting the parts in order to check the setting. If the divided circle was previously centered accurately, the verniers having been accurately set with respect to the 0°–180° diameter will also line up accurately with respect to all other diameters.

In this method of construction, the spacing of the arcuate edges of the verniers from the circular reading edge of the divided circle being predetermined is not adjustable as in prior instruments. It will be understood that this adjustment affected the apparent length of the vernier (angle subtended by vernier graduations compared to the corresponding angle subtended by the circle graduations). With the present construction and method the lengths of the verniers are automatically correct and errors of this sort are completely eliminated.

Having thus described the invention, what is claimed is:

1. A surveying instrument comprising a member carrying a divided circle, a vernier carrying member having graduations forming a pair of verniers permanently positioned relative thereto at diametrically opposite positions with respect to said divided circle and bearing means concentric with said divided circle mounting said members for rotation with respect to each other, both of said verniers lying in the plane of said graduated circle and being graduated to arcuate edges which if extended would form a continuous circle, the radius of said arcuate edges being of predetermined different length than the radius of the edge of said divided circle to which said divided circle is graduated so that a predetermined spacing between said edges of said verniers and said edge of said divided circle will be obtained when the parts are in proper adjustment and means for adjusting said vernier carrying member with respect to said bearing means to make the arcuate edges of said verniers concentric with the axis of rotation of said verniers and said divided circle.

2. In a surveying instrument having an alidade rotatable with respect to a divided circle about a base, means for centering said divided circle with respect to the axis of rotation, a vernier carrying plate releasably secured to said alidade and having graduations forming a pair of verniers permanently positioned relative to said plate at diametrically opposite positions wtih respect to said divided circle, both of said verniers being graduated to arcuate edges which if extended would form a continuous circle, the radius of said arcuate edges being of predetermined different length than the radius of the edge of said divided circle to which said divided circle is graduated so that a predetermined spacing between said edges of said verniers and said edge of said divided circle will be obtained when the parts are in proper adjustment, two pairs of adjusting means acting in a plane parallel to the graduations between said vernier carrying plate and said alidade, each pair of adjusting means acting in mutually opposing relation along mutually perpendicular diameters for adjusting said vernier carrying plate to make the arcuate edges of said verniers concentric with the axis of rotation and means for securing said vernier carrying plate against said alidade in adjusted position.

3. In a surveying instrument having an alidade rotatable with respect to a divided circle about a base, said alidade being provided with a horizontal plate extending over said divided circle, means for centering said divided circle with respect to the axis of rotation, a vernier carrying plate releasably secured under the horizontal plate of said alidade within said divided circle and having graduations forming a pair of verniers permanently positioned relative to said plate at diametrically opposite positions with respect to said divided circle, screw means acting between the vernier carrying plate and the horizontal plate of said alidade for bending said vernier carrier plate very slightly to adjust the graduated surface of said verniers into the same horizontal plane as the graduated surface of said divided circle, both of said verniers being graduated to outer edges which if extended would form a continuous circle, the radius of said arcs being of predetermined different length than the radius of the inner edge of said divided circle to which said divided circle is graduated so that a predetermined spacing between said edges of said verniers and said edge of said divided circle will be obtained when the parts are in proper adjustment, two pairs of adjusting means acting in a plane parallel to the graduations between said vernier carrying plate and said alidade, each pair of adjusting means acting in mutually opposing relation about mutually perpendicular diameters for adjusting said vernier carrying plate to make the arcuate edges of said verniers concentric with the axis of rotation and means for securing said vernier carrying plate in adjusted position against said horizontal plate of said alidade.

References Cited in the file of this patent

UNITED STATES PATENTS

| | | |
|---|---|---|
| 1,010,339 | Angel | Nov. 28, 1911 |
| 1,958,512 | Egy et al. | May 15, 1934 |
| 2,171,755 | Langsner | Sept. 5, 1939 |
| 2,280,057 | Brunson | Apr. 21, 1942 |
| 2,596,468 | Callahan | May 13, 1952 |
| 2,746,155 | Churgin | May 22, 1956 |

FOREIGN PATENTS

| | | |
|---|---|---|
| 40,445 | France | Mar. 29, 1932 |
| 496,025 | Great Britain | Nov. 23, 1938 |
| 548,511 | Great Britain | Oct. 13, 1942 |
| 118,432 | Sweden | Mar. 26, 1947 |